(12) United States Patent
Kosai

(10) Patent No.: US 10,082,586 B2
(45) Date of Patent: Sep. 25, 2018

(54) DETECTION OF RADIATION WITH SOFTWARE METHODS

(71) Applicant: Pioneer Square Labs, Inc., Seattle, WA (US)

(72) Inventor: Ryan Kosai, Seattle, WA (US)

(73) Assignee: Pioneer Square Labs, Inc., Seattle, WA (US)

( * ) Notice: Subject to any disclaimer, the term of this patent is extended or adjusted under 35 U.S.C. 154(b) by 0 days.

(21) Appl. No.: 15/208,589

(22) Filed: Jul. 12, 2016

(65) Prior Publication Data

US 2017/0357014 A1    Dec. 14, 2017

Related U.S. Application Data

(60) Provisional application No. 62/350,070, filed on Jun. 14, 2016.

(51) Int. Cl.
*G01T 1/24* (2006.01)
*G01T 1/17* (2006.01)

(52) U.S. Cl.
CPC .............. *G01T 1/245* (2013.01); *G01T 1/17* (2013.01)

(58) Field of Classification Search
CPC    G01T 1/24; G01T 1/26; G01T 1/2928; H01L 31/115; H01L 31/00
See application file for complete search history.

(56) References Cited

U.S. PATENT DOCUMENTS

| | | | |
|---|---|---|---|
| 2011/0275356 A1* | 11/2011 | Best | G01T 7/00 455/414.1 |
| 2014/0281805 A1* | 9/2014 | Sah | G11C 29/42 714/764 |
| 2016/0103736 A1* | 4/2016 | Bose | G06F 11/073 714/764 |

\* cited by examiner

*Primary Examiner* — David Porta
*Assistant Examiner* — Mamadou Faye
(74) *Attorney, Agent, or Firm* — Lane Powell PC

(57) ABSTRACT

A system for detecting radiation using computing devices.

10 Claims, 6 Drawing Sheets

DETECTION OF RADIATION WITH SOFTWARE METHODS

CROSS REFERENCE TO RELATED APPLICATIONS

This patent application claims the benefit of and priority to U.S. Provisional Patent Application Ser. No. 62/350,070 filed on Jun. 14, 2016, entitled "Detection of Ionizing Radiation," the disclosure of which is hereby incorporated by reference for all purposes.

TECHNICAL FIELD

The disclosed subject matter pertains generally to the area of radiation detection.

BACKGROUND INFORMATION

Radiation is a danger to both the environment as well as people. Radiation may be caused by relatively innocuous and common things such as cell phones, transmission lines, televisions, cooking appliances, and countless other devices. In the vast majority of cases, the radiation levels are well below what would be harmful either to human beings or the environment. However, in certain instances radiation levels exceed safe levels. For example, malfunctioning devices may sometimes result in radiation levels that exceed safe limits. In another example, malicious forces may seek to harm others using radiation-based weaponry, such as a dirty bomb or the like.

A need exists for the detection of radiation to avoid its harmful effects.

SUMMARY OF EMBODIMENTS

Embodiments are directed to a system for detecting radiation using ordinary (non-special purpose) computing devices. The system implements a software agent that executes a technique for weakening a memory range or cell to make it more susceptible to bit-flipping. The system then monitors for the occurrence of bit-flipping which may be due to incidence of radiation. The system further distributes instances of the software agent to a multiplicity of computing systems. Each software agent monitors for the occurrence of bit-flipping, which may be due to incident radiation, and reports data to a central monitoring facility. The central monitoring facility aggregates the data to reveal the presence of radiation threats.

DETAILED DESCRIPTION

Disclosed is a system for the detection of ionizing radiation. Generally stated, the system monitors a memory area on a computing device. The system them performs a computing technique to make that memory area more susceptible to being impacted by ambient radiation. The system then monitors whether and to what degree that memory area succumbs to the potential influence of ambient radiation. In a preferred embodiment, the system is implemented as distributed software agents that execute on a multiplicity of geographically-disparate computing devices. The software agents each report back results of their respective assessments. The system monitors, tracks, maps, and reports on the potential for ambient radiation over the entire geographically-disparate area.

Ambient Radiation Manifested as a "Bit-Flip"

Figure 1:
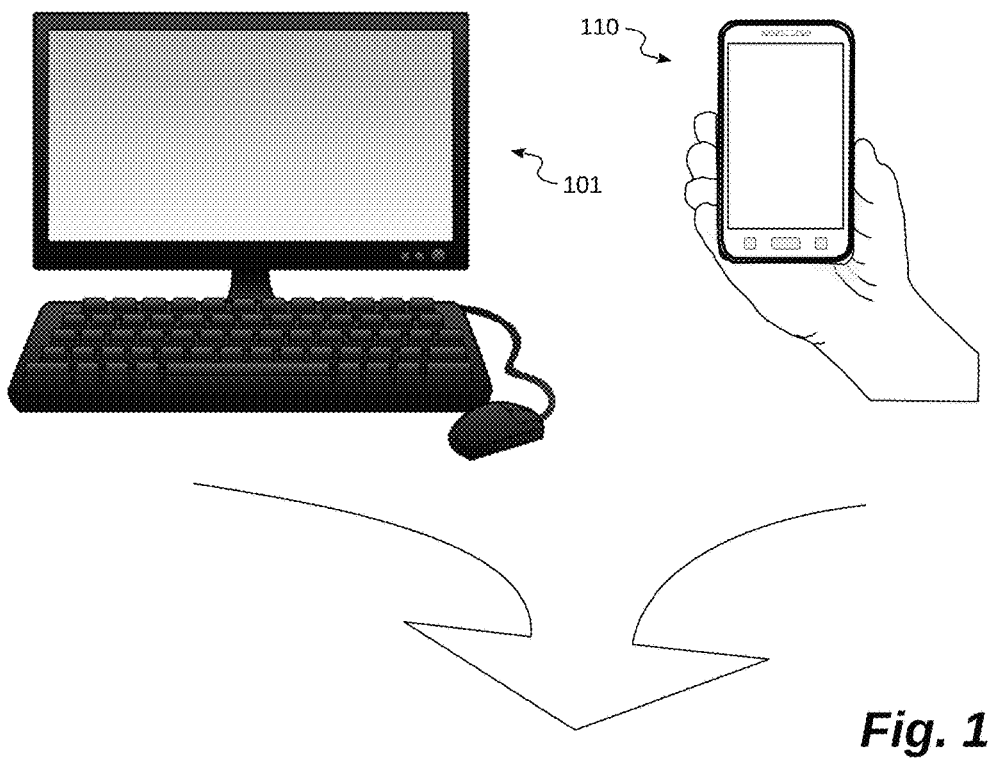
FIG. 1 is a conceptual illustration of how computing devices may be susceptible to the influence of ambient radiation.
Figure 1:
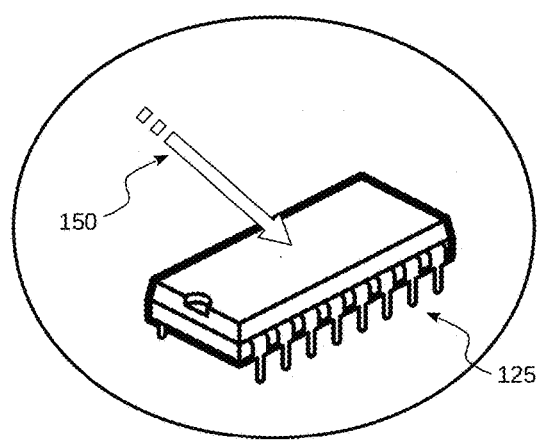

Referring briefly to FIG. 1, shown are a general purpose computing device 101 and a handheld computing device 110. In this example, the general purpose computing device 101 is illustrated as a desktop computer. In other examples, the general purpose computing device 101 may also be a laptop or notebook computer, or any other computing device. Likewise, the handheld computing device 110 is illustrated as a cellular telephone with integrated computing functionality. In other examples, the handheld computing device 110 could be a tablet computer or the like. It will be appreciated that computing devices typically operate using various types of memory cells based on slight variations of memory cell technology, such as SRAM, DRAM, SDRAM, and various others. Illustrated in FIG. 1 is an illustrative memory chip 125 which encloses a memory array of numerous memory cells.

Radiation present in the atmosphere (ambient radiation 150), such as ionizing radiation, can induce anomalies in the hardware of a properly-functioning computing device, such as memory chip 125. One example of a phenomenon is a so-called "bit-flip" of a memory cell. The term bit-flip refers to the event where a radiation particle incident on a memory cell causes the memory cell to flip its state from a logical zero to a logical one, or vice versa. In fact, designers of spacecraft and satellites go to great lengths and expense to minimize bit-flipping through radiation hardening.

Figure 6:
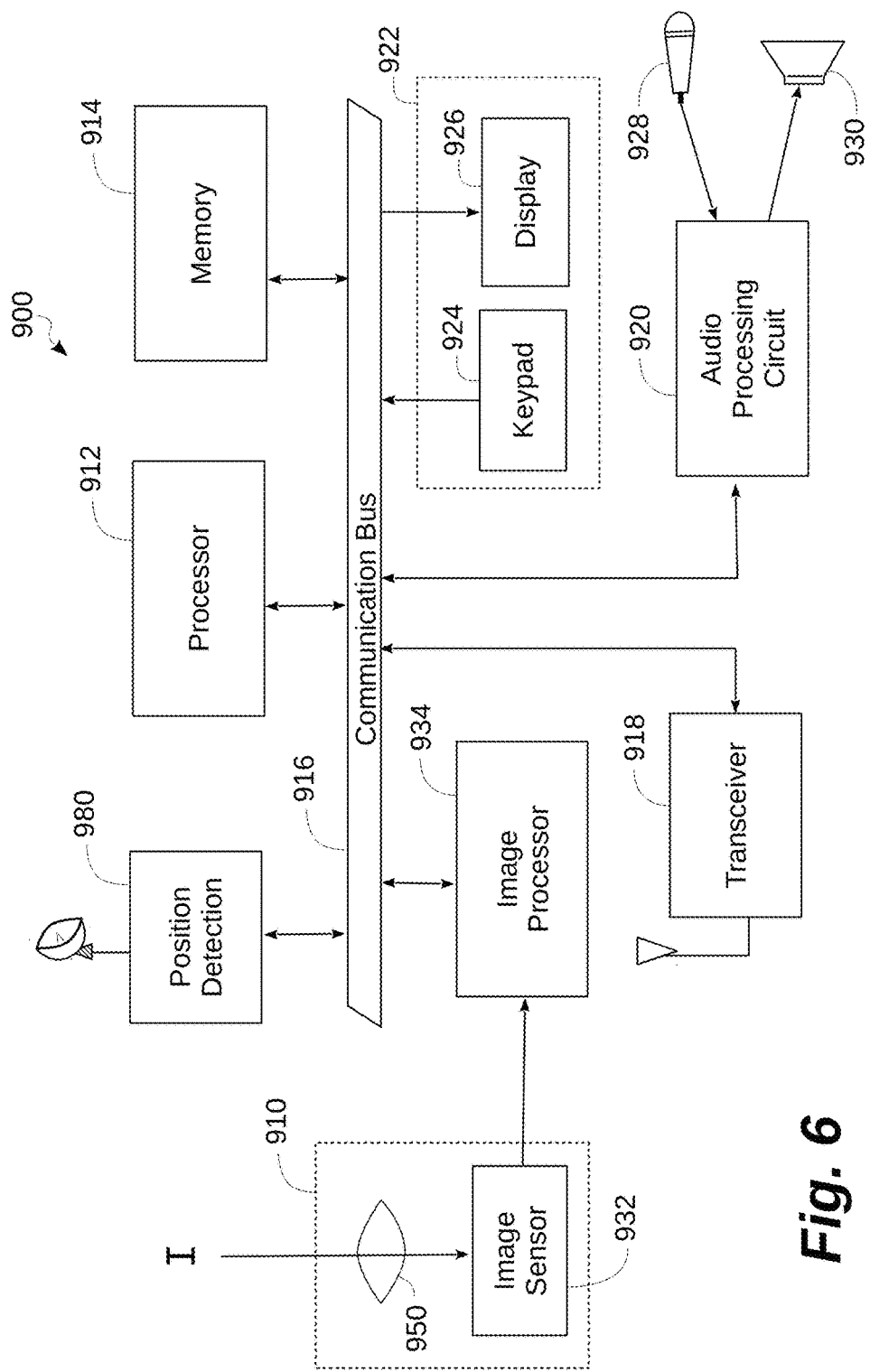
FIG. 6 is a functional block diagram generally illustrating one possible example of a computing device that may be used in various embodiments.

Memory array devices are sufficiently susceptible to bit-flipping from ambient radiation that they are sometimes used in specialized radiation detection devices. However, the memory array devices used in such radiation detection devices are specially designed with weakened memory cells that are more susceptible to bit-flipping than are memory array devices used in computer processing equipment. Generally stated, computer processing equipment—such as the computing devices illustrated in FIG. 1 and FIG. 6—uses memory array devices that are much less susceptible to bit-flipping from radiation, although it does still sometimes happen. Large voltage deviations between binary opposite charges (logic zero versus logic one) in a memory cell of a computing device lessens the effect of ambient radiation in the memory cell. In other words, the larger the voltage difference between a logical zero and a logical one, the less likely is the occurrence of a bit-flip due to ambient radiation. For this reason, computing systems are typically designed and constructed using a sufficiently high voltage separation from logic zero to logic one that radiation-induced bit-flipping is relatively rare, and occurs in random memory locations.

Although discussed in the context of a bit-flip occurring in a memory cell, it should be appreciated that the teachings of this disclosure have equal applicability to many other environmental sensors that may be used in a computing device. For example, many computing devices are provided with cameras and audio detection components. Ambient radiation may also introduce errors into such additional sensors, which could be used as alternative or additional measurement devices in alternative embodiments. Accordingly, other embodiments may evaluate data collected using any form of environmental sensor that may be affected by the presence of radiation, such as a camera, audio jack, a temperature sensor, gyroscope, barometric pressure sensor, or the like.

Enhancing the Sensitivity of a Memory to Radiation

The disclosed embodiments implement a system to render one or more memory cells of a computing device more susceptible to bit-flipping so that the memory cell is more sensitive to the incidence of ambient radiation. The disclosed embodiments lessen the amount of radiation necessary to introduce a bit-flip, thereby making the entire system more prone to reveal the presence of radiation.

Preferred embodiments employ executable software code specially designed to perform a memory cell weakening technique and monitor for the occurrence of unintended bit-flipping. For the purpose of this disclosure, the executable software code will be referred to as a "software agent." In operation, the software agent may allocate memory space for detecting ionizing radiation using techniques for detecting and quantifying radiation based on hardware bit-flipping. In one particular embodiment, the software agent performs a method to induce memory cell disturbance errors similar to those that may be used in certain cyber attacks.

A technique referred to as "row hammering" is sometimes used to target a particular bit or particular bits of an executing computer system for the purpose of attempting to flip those bits. Row hammering is performed by repeated access to a single row or rows of a memory array which can impart leakage and parasitic currents to adjacent rows of the memory array. The effect is that the adjacent row of memory is more susceptible to an unintended bit-flip. Row hammering is a known technique for increasing the potential for a bit-flip to occur, although it has been exclusively used in the context of attempting to circumvent electronic security measures.

Figure 2:
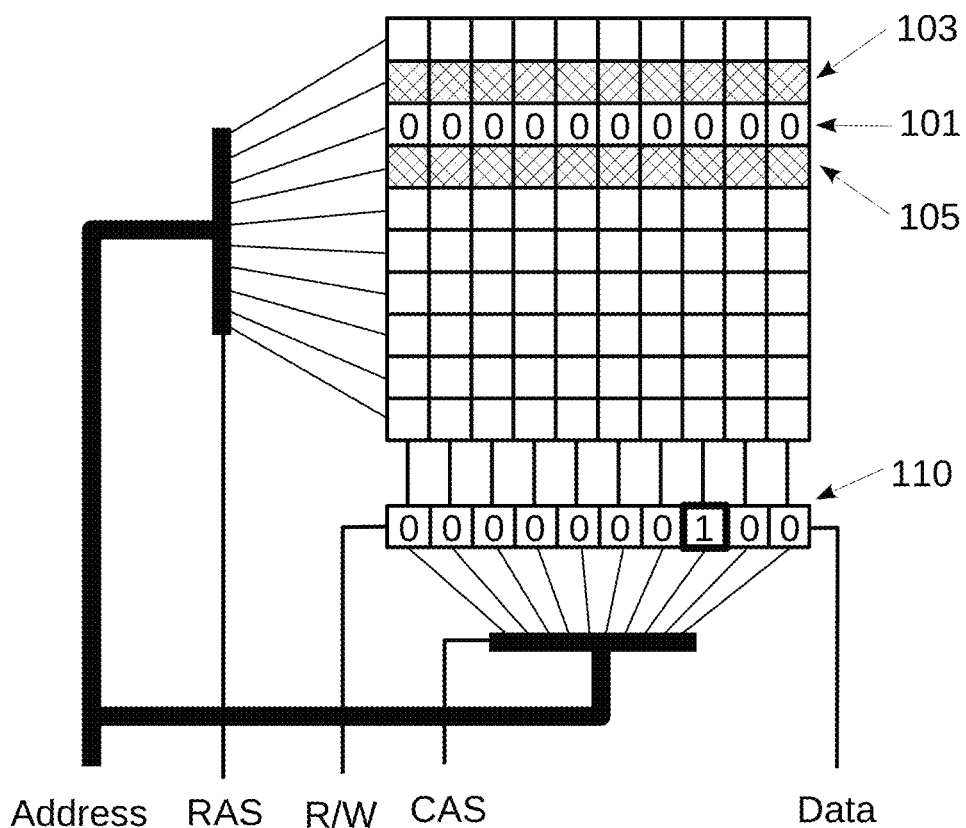
FIG. 2 is a conceptual illustration of a memory array undergoing a "row hammering" technique.

FIG. 2 is an illustration of a row hammering attack as may be used in implementations of the preferred embodiment. Shown in FIG. 2 is a conceptual memory array 100 made up of a number of rows and columns. As illustrated, a target memory row 101 is written to contain any known set of bits, all zeros in this example. The target row 101 is attacked by repeatedly accessing a row of memory immediately above 103, a row of memory immediately below 105, or both above and below the target row 101. Quickly accessing the memory cells adjacent to the memory cells of the target row 101 may cause current leakage between the attack rows (103 and 105) and the target row 101, which greatly increases the likelihood that the target row 101 may experience a bit-flip. As illustrated, hammering the target row 101 results in one particular bit flipping from a logical zero to a logical one in the third-least significant bit of this example.

In the preferred embodiment, row hammering is performed for the purpose of making harmless memory locations more susceptible to bit-flipping so that radiation-induced bit-flipping is more likely to occur. In this way, bit-flipping is more likely to occur generally, thereby resulting in a lower amount of radiation necessary to induce bit-flipping. In this way, a computing device may be transformed from a general purpose computing device—which is relatively impervious to radiation-induced bit-flipping—into an ambient radiation detection device that is much more susceptible to radiation-induced bit-flipping.

Again, the row hammering (or similar) technique of the preferred embodiment is not performed for the purpose of a security breach. Accordingly, a software agent implementing a preferred embodiment may make use of any arbitrary memory locations rather than specific memory locations known to contain security-sensitive data. For the purpose of this disclosure, the term "harmless memory location" refers to any memory address or location the selection of which is not based on any attack on bits known to contain security-based data (such as bits indicating a privilege level, or the like). In the preferred embodiment, harmless memory locations include, for example, any memory available to browser software regardless of whether it is sandboxed.

In certain implementations, the software agent may attempt to identify the hardware it is running on, and use specialized software, algorithms, or configuration that is optimized for the underlying hardware architecture. For instance, it may be advantageous to attempt to ensure that when accessing bits in the attack rows (103 and 105), those accesses are actually being made to the memory locations in the memory array 100 rather than merely accessing memory stored in cache memory. Accordingly, some row hammer techniques may benefit from assumptions around the cache eviction strategy of underlying hardware, in just one example. It should be appreciated that "accessing" a memory cell could constitute either reading from, or writing to, or both reading to and writing from the memory cell. However, the techniques of the preferred embodiment may benefit from performing only one form of access, such as only reading from the memory cell. However, any access that accomplishes the desired end result—memory cells more susceptible to radiation influence—may be employed.

In certain implementations, the software agent may alter the rate at which bits are accessed in one or both of the attack rows (103 and 105) for the purpose of slightly altering the amount of current leakage that may occur. In this way, very minor variations may be made in the susceptibility of the target row 101 to bit flipping. As mentioned, ambient radiation impacting the memory cells of the target row 101 may cause one or more bits to flip. Ambient radiation may present slightly different impact on memory cells depending on characteristics of the radiation (e.g., frequency, amplitude, wavelength, energy, velocity, etc.). By varying the rates and perhaps other characteristics (e.g., value of bits being accessed, altering the delay between accessing bits, etc.) of the row hammering of the preferred embodiment, specific radiation frequencies may be examined.

In operation, the software agent executing the row hammering (or similar) technique records relevant performance data associated with the test. Examples of the information that may be collected includes, but is not limited to, the total number of bits accessed, the rate at which bits are accessed, timing intervals between accesses if they vary, the length of time the test was performed, the time of day the test was performed, the number of bits that flipped, memory locations of flipped-bits, relative location of the flipped-bits, what time of day each bit flipped, how long the test ran before any or each bit flipped, and the like. In the preferred embodiments, the software agent also may record measurements of non-software alterations to the memory space, including but not limited to the frequency, timing, and distribution of bit-level changes. Many more examples of information about the test that may be recorded will become apparent to those skilled in the art.

Although illustrated and described as an attack on a single row of memory cells, it should be appreciated that to increase the statistical significance and likelihood of a bit-flip occurring, a large number of memory accesses may need to be performed on the attack rows (103 and 105). Increasing the number of memory accesses may be accomplished in numerous ways, such as by allocating a large number of memory locations for each particular test, or performing the test for an extended duration, or both. These and many other techniques may be employed to enhance the statistical significance of each particular test. It will also be appreciated that the number of memory accesses performed during a test may be balanced against the load on and power consumption of the host computing device.

Wide Scale Distribution of Detection Code Snippets or "Pixels"

Transforming a single computing device into a specialized radiation detection device through software provides significant safety and security advantages. However, the system of the preferred embodiment also implements a distribution and reporting function that adds additional advantages. In the preferred embodiment, instances of the software agent are distributed to a multiplicity of computing devices over a large disparate geographic area. Each of the multiplicity of software agents executes on its own host computing device detecting the likelihood of ambient radiation incident on that host computing device. Each software agent then reports back results of its own testing.

Figure 3:
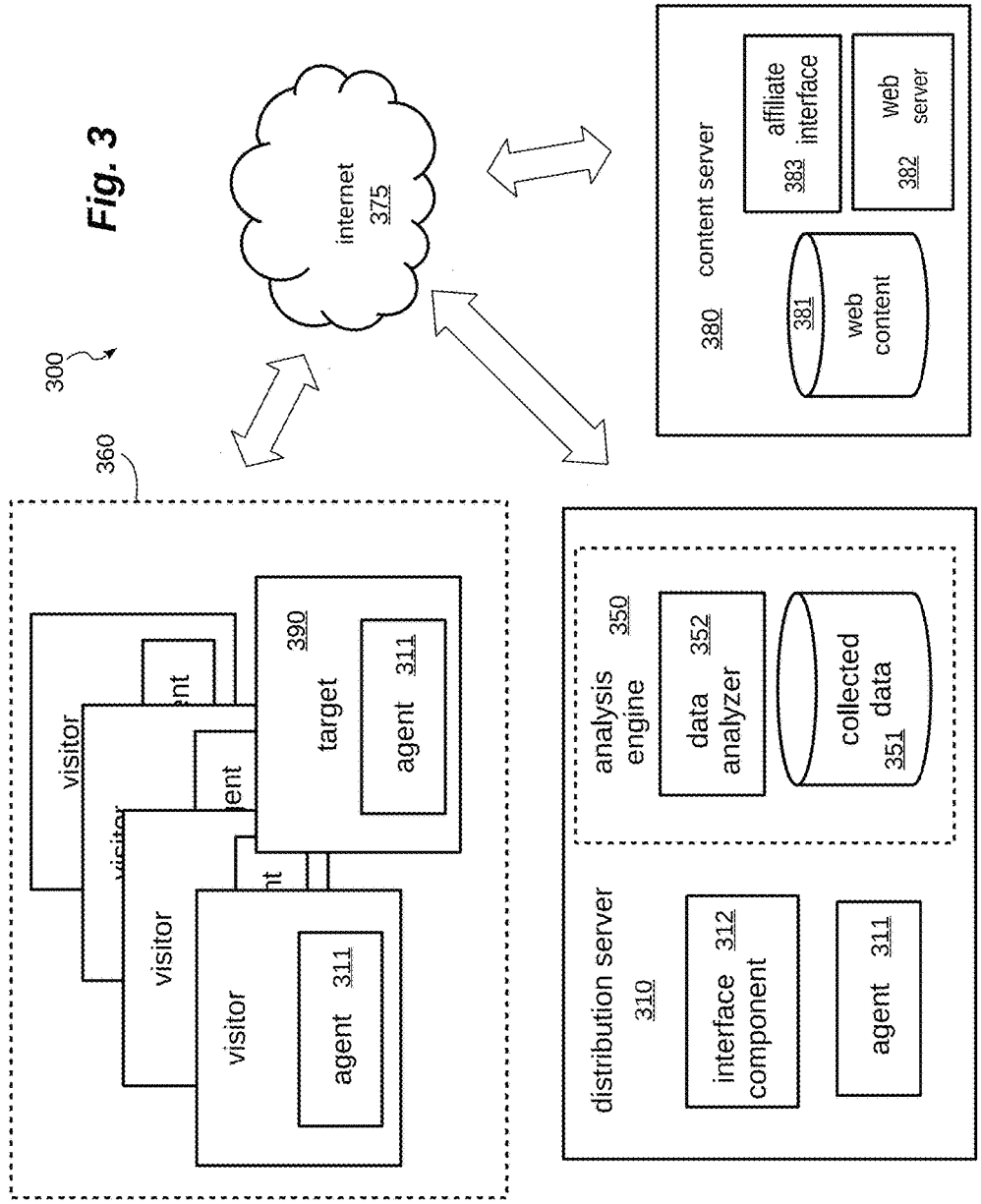
FIG. 3 is a functional block diagram of a system for distributing software agents for detecting ambient radiation, in accordance with one embodiment.

Turning to FIG. 3, one embodiment of a radiation detection system 300 is shown. Generally stated, the radiation detection system 300 aggregates and analyzes radiation incidence data to detect the likelihood of an area experiencing higher-than expected radiation. The radiation detection system 300 of the preferred embodiment includes a distribution server 310 and an analysis engine 350.

In one preferred embodiment, the radiation detection system 300 is implemented by distributing a software agent 311 that is specially configured to perform a radiation detection technique, such as row hammering as described above, on a computing device. In the preferred embodiment, the software agent 311 may be either an internet-deliverable applet or snippet of code, or it may be a self-contained native-executable application, or both, or some combination of the two. The software agent 311 may reside on the distribution server 310 for delivery to disparate computing devices over a wide area network 375, such as the internet.

The distribution server 310 may also host an interface component 312 that provides connectivity between the distribution server 310 and other computing devices over the wide area network 375. For example, the distribution server 310 may communicate with a content server 380 and/or one or more visitor computing devices 360, such as target computing device 390.

In one preferred embodiment, the content server 380 includes a web server component 382 that serves up web content 381. The particular type of content 381 being served is unimportant to this disclosure and may take any form, such as news, sports, financial information, political information, encyclopedic information, historical information, or anything else that can be served up over the internet.

The content server 380 may also include an affiliate interface 383 that provides a communication path between the content server 380 and other computing devices, such as advertising affiliates or the like. The affiliate interface 383 enables the content server 380 to deliver the web content 381 with additional dynamically-added data such as advertisements. For example, ordinary web sites often deliver advertising that is provided by third-party affiliates. In one specific example, a news-related web site may serve advertisements that are provided by a third-party advertising affiliate. As is known, such advertisements may take the form of multimedia content, static images, text, or even executable code, such as Java or javascript code. Delivery of third-party content in conjunction with substantive web content is well known.

In one preferred embodiment, the software agent 311 is delivered to disparate computing devices embedded within the web content 381 of the content server 380. As any one or more visitor computing devices 360 accesses the content server 380, the affiliate interface 383 retrieves the software agent 311 from the distribution server 310 and dynamically embeds it within the web content 381, which is then served to the visitor computing devices using the web server 382. In this way, the software agent 311 may be deployed from popular web sites to which many people ordinarily visit, such as popular news or shopping sites. This enables very many instances of the software agent to be deployed to countless computing devices, such as target computing device 390, across the globe.

In the preferred embodiment just described, the software agent 311 is a web-based script distributed as code on a website or within an online advertisement. In another preferred embodiment, the software agent 311 may run as a native application on the host computing device. In such an embodiment, the software agent 311 may be distributed directly using an interface component 312. Each embodiment has its own strengths and weaknesses. For instance, a web-based script may be remotely deployed very easily to a vast number of disparate devices. However, the web-based script will commonly be executed within a secure execution environment which limits the functionality that may be implemented. In contrast, a native application can execute without the constraints of a security sandbox and may be executed anywhere in the memory space of the host computing device. However, a native application must be installed locally and requires heightened security credentials to install, making it more difficult to install from a remote location.

When executing on each host computing device, the software agent 311 executes the radiation detection scheme, such as row hammering, discussed above in conjunction with FIG. 2. While the software agent 311 executes on a host computing device, such as target computing device 390, it collects radiation incidence data. In various implementations, the radiation incidence data may include any data revealed through the test, such as how many bits were accessed; how many bits flipped in total and/or per bit accessed; how long the test ran; what time the bits flipped; which bits flipped in particular memory locations. In addition, the software agent 311 may collect other data about the test, such as data about the host machine (e.g, IP address, MAC address, geo-location, GPS data, wifi info, SSID, signal strength, MAC address of router/ap, air pressure if there is a barometric reader, altitude if there is an altimeter, and the like). The radiation incidence data is returned to the analysis engine 350, which may be a component of the distribution server 310 or it may be a separate computing facility.

Additional data may be collected from the device to support geolocation. For example, GPS coordinates, available wireless networks, and cell network endpoints may be used to compute a physical location. Collected data may be used to identify the intensity, type, and location of the ionizing radiation. For example, the preferred embodiment may be particularly well suited toward identifying gamma and neutron radiation.

The analysis engine 350 receives and stores radiation incidence data received from the various disparate computing devices, such as visitor computing devices 360, that transmit such information. Accordingly, the analysis engine 350 stores the received radiation incidence data as collected data 351. A data analyzer 352 reviews and analyzes the data to produce reports on In this way, the collected data 351 may be used, individually and/or in the aggregate, to identify anomalous, threatening, or dangerous radiation patterns. Such a system may provide notifications or alerts, or provide a score for radiation based events.

In certain embodiments, the data analyzer 352 generates several reports using the collected data 351. For example, the data analyzer 352 may generate a metric that correlates a number of observed bit-flips to some units of radiation, such as a certain number of bit-flips per kilobyte, megabyte, or gigabyte tested. Another metric may measure a bit-flip occurrence per unit of time, or perhaps, correlated by proximity in memory locations.

The data analyzer 352 uses the collected data 352 to create a baseline for an amount of radiation present. The baseline may be calculated by locality, by region, by larger geographic areas. In this way, various areas may be compared to others to determine whether any one or more areas has a higher-than-baseline observed radiation level. Geo-location information in or derived from the collected data may be used to map the results. It will be understood that in some cases geo-location information may either be unavailable or inaccurate depending on the circumstances. For instance, often location data derived from network addresses (e.g., IP addresses or the like) for mobile devices does not correctly resolve to an accurate geographic location. In another example, certain visiting computing devices may receive the software agent 311 by visiting the content server 380 through a proxy server to mask the IP address of the visiting computing device. In such a case, the geo-location for the radiation incidence data would not correctly resolve to the location of the visiting computing device. In these cases, the data analyzer 352 may segregate such data and either use it for reports that are not based on geography or, instead, correlate the data to the location of the proxy server. In still another example, the data analyzer 352 may identify collected data that originated from an automated profile, such as may be created by a web bot, or the like. Such artificial data may also be unreliable and should be handled separately from collected data that is apparently generated through normal web site visiting habits.

Figure 4:
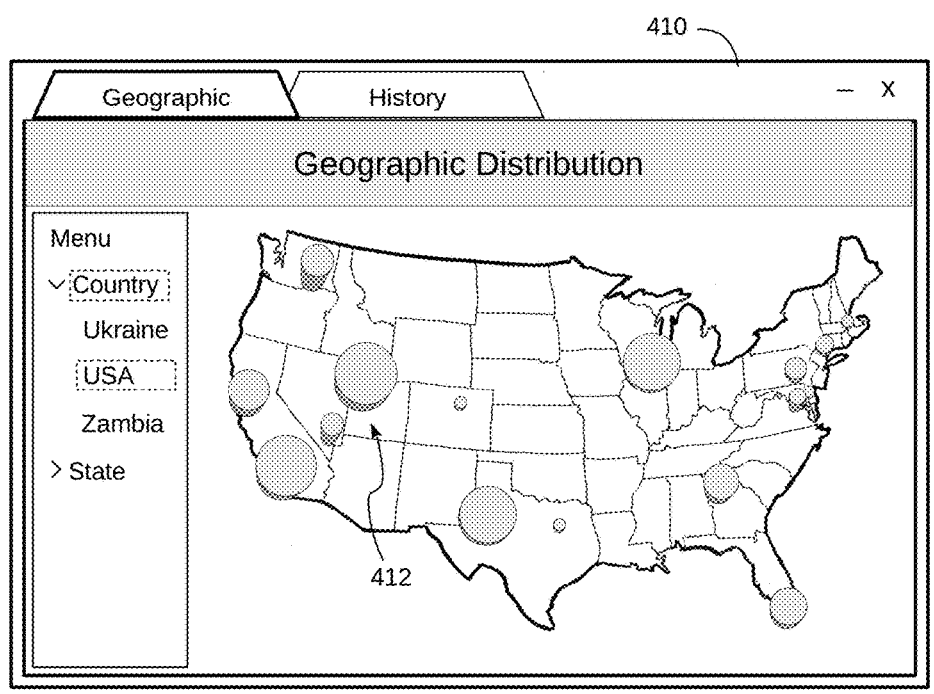
FIG. 4 is a conceptual user interface for reviewing data derived from a multiplicity of distributed software agents, in accordance with one embodiment.
Figure 5:
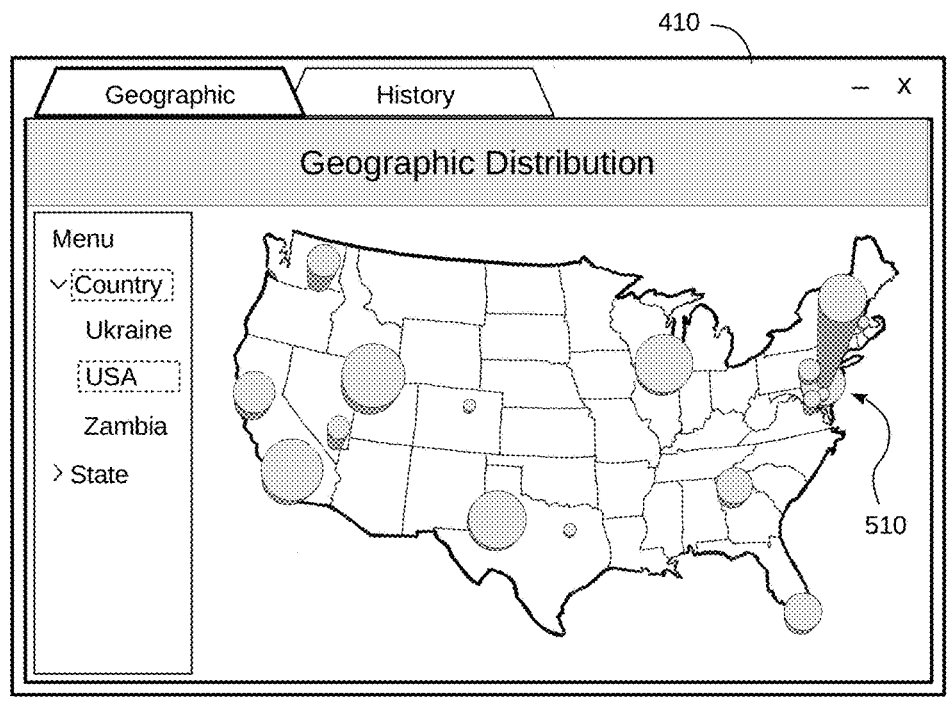
FIG. 5 is another conceptual user interface for reviewing data derived from a multiplicity of distributed software agents, in accordance with one embodiment.

Tuning now to FIGS. 4 and 5, the analysis engine 350 may expose a user interface or portal to allow users to review the radiation incidence data either at the individual reporting software agent level or in the aggregate. Once the collected data is analyzed, patterns will reveal themselves which provide insight into the existence of dangerous radiation which may not be readily apparent from any other investigating mechanism. Shown in FIGS. 4 and 5 are conceptual screen captures of radiation incidence data displayed on a geographic area. In this particular example, the analysis engine 350 may correlate observed radiation incidence data by geographic area and display relative values by geographic area. In FIG. 4, the observed presence of radiation in geographic areas is, in this particular example, illustrated by discs having a diameter and a height (e.g., area 412). As illustrated, the diameter of the disc may represent the number of observed occurrences of radiation that deviates from a baseline, and the height of the disc may represent the amount by which the observed occurrence deviates from the baseline. In other words, wide and short discs represent a large number of relatively-small deviations, while narrow but tall discs represent a small number of observed occurrences but which represent a large deviation from the baseline. As is apparent from the example illustrated in FIG. 4, many areas having larger populations may display result in many. slightly elevated levels of radiation. In contrast, areas with low population density may be in line with the baseline metrics.

Turning now to FIG. 5, it should be appreciated that the value of the illustrative radiation detection system becomes apparent when the data analyzer 352 reveals a particular geographic area having a radiation level with an abnormally high deviation from the baseline. In the illustrated example, perhaps an observed occurrence of radiation reveals that a few reporting software agents represent a large deviation from the baseline (e.g., around New York City 510). In such a case, there may be valid explanations for such a result, such as an area may be high in radon, an individual using a reporting computing device may have recently undergone radiation therapy of some sort, or the like. However, in the event such an occurrence may be the result of an individual with malicious intent or some form of accident, the report 410 generated by the data analyzer provides a user with the opportunity to investigate before a catastrophic event occurs.

FIG. 9 is a functional block diagram generally illustrating one possible example of a computing device 900 that may be used in various embodiments. As shown, computing device 900 includes several functional components to enable policing online advertisements. The example computing device may be implemented as one or more of any number of devices, such as a mobile phone, a tablet computer, a personal digital assistant, a notebook or ultrabook computer, a desktop computer, a server computer, a virtual machine, or the like.

The computing device 900 may include a processor 912, a memory 914, communication circuit 916, transceiver 918, audio processing circuit 920, user interface 922, image sensor 932, image processor 934, and optical system 950. Processor 912 controls the operation of the computing device 900 according to programs stored in program memory 914. The communication circuit 916 interfaces the processor 912 with the various other components, such as the user interface 922, transceiver 918, audio processing circuit 920, and image processing circuit 934. User interface 922 may include a keypad 924 and a display 926. Keypad 924 allows the operator to key in alphanumeric characters, enter commands, and select options. The display 926 allows the operator to view output data, such as entered information, output of the computing device 900, images or other media, and other service information. In certain computing devices, the user interface 922 combines the keybad 924 and the display 926 into a touchpad display.

The computing device 900 may also include a microphone 928 and speaker 930 though certain computing devices may not have such features. Microphone 928 converts sounds into electrical audio signals, and speaker 930 converts audio signals into audible sound. Audio processing circuit 920 provides basic analog output signals to the speaker 930 and accepts analog audio inputs from the microphone 928. Transceiver 918 is coupled to an antenna 936 for receiving and transmitting signals on a suitable communications network (not shown).

Image sensor 932 captures images formed by light impacting on the surface of the image sensor 932. The image sensor 932 may be any conventional image sensor 932, such as a charge-coupled device (CCD) or complementary metal oxide semiconductor (CMOS) image sensor. Additionally, the image sensor 932 may be embodied in the form of a modular camera assembly with or without an integrated optical system 950. Image processor 934 processes raw image data collected by the image sensor 932 for subsequent output to the display 926, storage in memory 914, or for transmission by the transceiver 918. The image processor 934 is a signal microprocessor programmed to process image data, which is well known in the art. A position sensor 980 detects the position of the computing device 900 and generates a position signal that is input to the microprocessor 912. The position sensor 980 may be a Global Positioning System sensor, potentiometer, or other measuring device known in the art of electronics.

Other embodiments may include combinations and subcombinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, "feature" or "features" can refer to structures and/or functions of an apparatus, article of manufacture or system, and/or the steps, acts, or modalities of a method.

In the foregoing description, numerous details have been set forth in order to provide a sufficient understanding of the described embodiments. In other instances, well-known features have been omitted or simplified to not unnecessarily obscure the description.

A person skilled in the art in view of this description will be able to practice the disclosed invention. The specific embodiments disclosed and illustrated herein are not to be considered in a limiting sense. Indeed, it should be readily apparent to those skilled in the art that what is described herein may be modified in numerous ways. Such ways can include equivalents to what is described herein. In addition, the invention may be practiced in combination with other systems. The following claims define certain combinations and subcombinations of elements, features, steps, and/or functions, which are regarded as novel and non-obvious. Additional claims for other combinations and subcombinations may be presented in this or a related document.

The invention claimed is:

1. A system for detecting radiation, comprising:
a computing device having an installed memory, the installed memory comprising a multiplicity of memory cells, the multiplicity of memory cells being composed of addressable sets of memory cells, a target set of memory cells having a susceptibility to an influence of radiation; and
a software agent configured to execute a technique that alters the susceptibility to the influence of radiation from a first state to a second state, the second state being more susceptible to the radiation influence than the first state, the software agent being further configured to monitor the target set of memory cells for an indication of radiation, the software agent being further configured to report the indication of radiation, wherein the technique comprises repeatedly accessing an attack set of memory cells proximate to the target set of memory cells.

2. The system recited in claim 1, wherein each memory cell in the target set of memory cells is configured to reflect a logical value of either zero or one, and further wherein the indication of radiation comprises a change from zero to one or from one to zero.

3. The system recited in claim 1, wherein the software agent is further configured to transmit information describing the indication of radiation to an analysis engine.

4. The system recited in claim 3, wherein the software agent is further configured to collect environmental information about the computing device and further wherein the information describing the indication of radiation includes the environmental information.

5. The system recited in claim 4, wherein the information describing the indication of radiation includes at least one or more of how long the target set of memory cells were monitored, how many bits of memory were accessed, how many bits flipped, what time the bits flipped, and which bits flipped in particular memory locations.

6. The system recited in claim 4, wherein the environmental information includes at least one or more of IP address, MAC address, geo-location, GPS data, wifi info, SSID, signal strength, MAC address of router/ap, air pressure, and altitude.

7. The system recited in claim 1, wherein the technique further comprises repeatedly accessing a second attack set of memory cells also proximate to the target set of memory cells.

8. A system for reporting radiation, comprising:
a computing device having a memory, the memory including an analysis engine to analyze collected data about radiation detection, the collected data including information received from a multiplicity of disparate host computing devices, each host computing device having executed a software agent that performed a technique to alter a susceptibility of installed memory cells on its respective host computing device to the influence of radiation from a first state to a second state, the second state being more susceptible to the radiation influence than the first state, the software agent having been further configured to monitor a target set of installed memory cells for an indication of radiation, the software agent having been further configured to report the indication of radiation to the analysis engine, wherein the technique comprises repeatedly accessing an attack set of memory cells proximate to the target set of installed memory cells.

9. The system recited in claim 8, wherein the technique further comprises repeatedly accessing a second attack set of memory cells also proximate to the target set of memory cells.

10. The system recited in claim 8, wherein the technique comprises row hammering.

* * * * *